United States Patent
Croak et al.

(10) Patent No.: US 7,746,771 B1
(45) Date of Patent: Jun. 29, 2010

(54) METHOD AND APPARATUS FOR CONTROLLING LOGGING IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1248 days.

(21) Appl. No.: 11/240,064

(22) Filed: Sep. 30, 2005

(51) Int. Cl.
  G01R 31/08 (2006.01)
  G08C 15/00 (2006.01)
  H04J 3/14 (2006.01)
  G06F 15/16 (2006.01)
  G06F 15/173 (2006.01)
(52) U.S. Cl. ............... 370/229; 370/236; 370/230.1; 370/241.1; 709/201; 709/223; 709/238
(58) Field of Classification Search ............ 370/229, 370/236, 241.1, 254; 709/201, 223, 238
See application file for complete search history.

(56) References Cited

U.S. PATENT DOCUMENTS

| 2002/0042821 A1* | 4/2002 | Muret et al. ............... 709/223 |
| 2004/0225689 A1* | 11/2004 | Dettinger et al. ............ 707/200 |
| 2005/0138111 A1* | 6/2005 | Aton et al. ................. 709/201 |
| 2005/0232163 A1* | 10/2005 | Zabihi et al. ............... 370/254 |
| 2006/0143425 A1* | 6/2006 | Igarashi et al. ............. 711/173 |
| 2006/0282419 A1* | 12/2006 | Sen et al. ................... 707/4 |

* cited by examiner

Primary Examiner—Chi H Pham
Assistant Examiner—Farah Faroul

(57) ABSTRACT

A method and apparatus for providing an alerting tool to measure the amount of logging in a network component, for example a network element, and to provide an alarm to a network operator or an automated system when the amount of logging reaches a predefined threshold are disclosed. The network component can then be instructed to reduce the logging activities until all processes appear to be normally utilized and queue lengths return to a normal level.

17 Claims, 3 Drawing Sheets

METHOD AND APPARATUS FOR CONTROLLING LOGGING IN A COMMUNICATION NETWORK

The present invention relates generally to communication networks and, more particularly, to a method and apparatus for controlling logging in communication networks, e.g., packet networks such as Voice over Internet Protocol (VoIP) networks.

BACKGROUND OF THE INVENTION

Components, such as network elements, in a packet network such as a VoIP network, often produce logs that provide useful information about the state of the components and all transactions processing through them. These logs, however, are produced in real time and are stored in main memory. These logs often compete for Central Processing Unit (CPU) cycles and memory space with other valuable resources running on these components including transactions performing call set up messages. As such, increased amounts of logging during a high volume calling period can produce congestion within the CPU leading to delays and potential service disruptions.

Therefore, a need exists for a method and apparatus for proactively controlling logging operations in a packet network.

SUMMARY OF THE INVENTION

In one embodiment, the present invention enables an alerting tool to measure the amount of logging in a network component, such as a network element, and to provide an alarm to the network operator when the amount of logging reaches a predefined threshold. The component can then be instructed to reduce the logging until all processes appear to be normally utilized and queue lengths return to a normal level.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
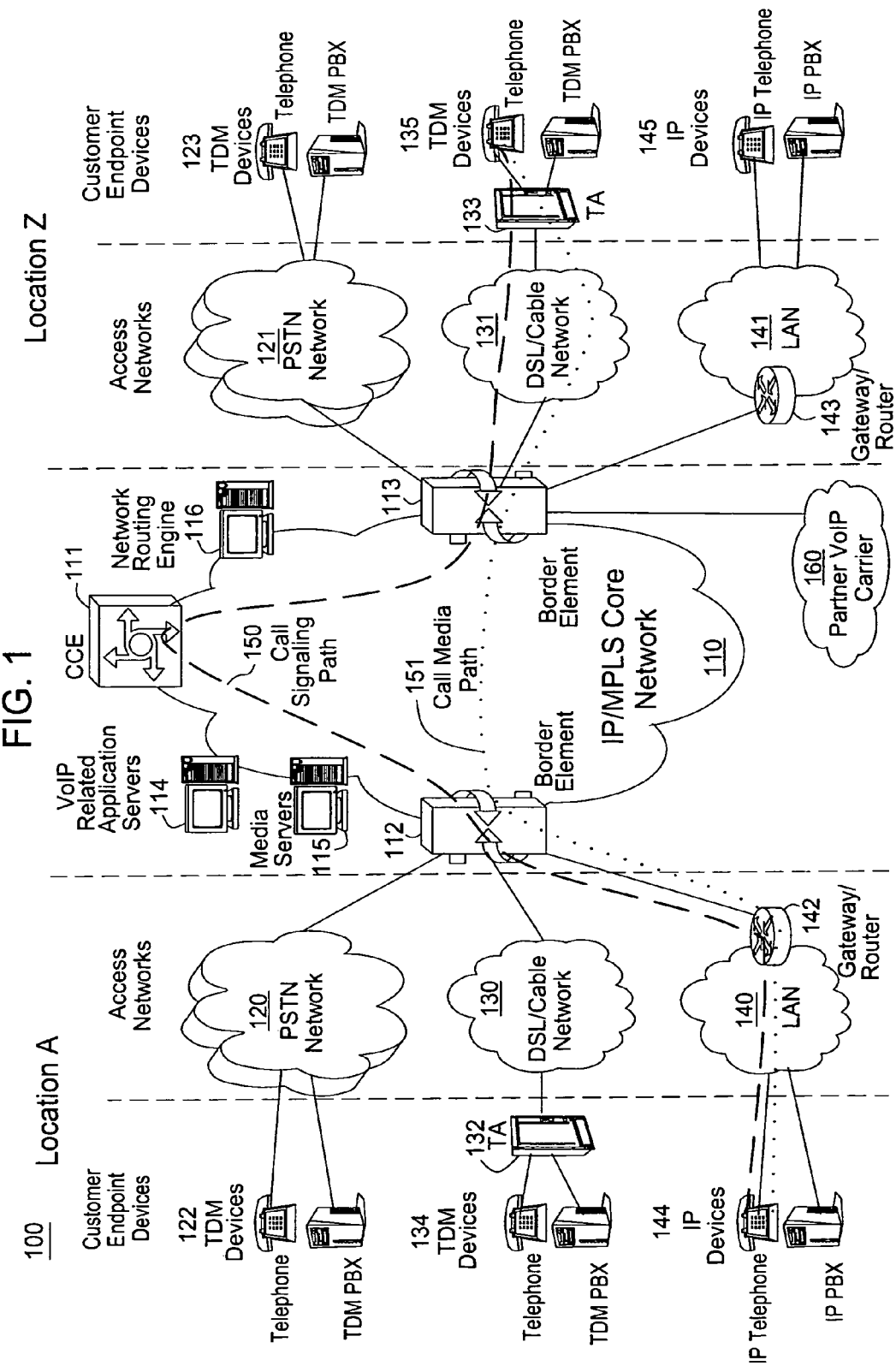
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is Used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Components, such as network elements, in a packet network such as a VoIP network often produce logs that provide useful information about the state of the components and all transactions processing through them. These logs, however, are produced in real time and are stored in main memory. These logs often compete for Central Processing Unit (CPU) cycles and memory space with other valuable resources running on these components including transactions performing call set up messages. As such, increased amounts of logging during a high volume calling period can produce congestion within the CPU leading to delays and potential service disruptions.

To address this need, the present invention enables an alerting tool to measure the amount of logging in a network component, such as a network element, and to provide an alarm to the network operator or an automated system when the amount of logging reaches a predefined threshold. The component can then be instructed to reduce the logging until all processes appear to be normally utilized and queue lengths return to a normal level.

Figure 2:
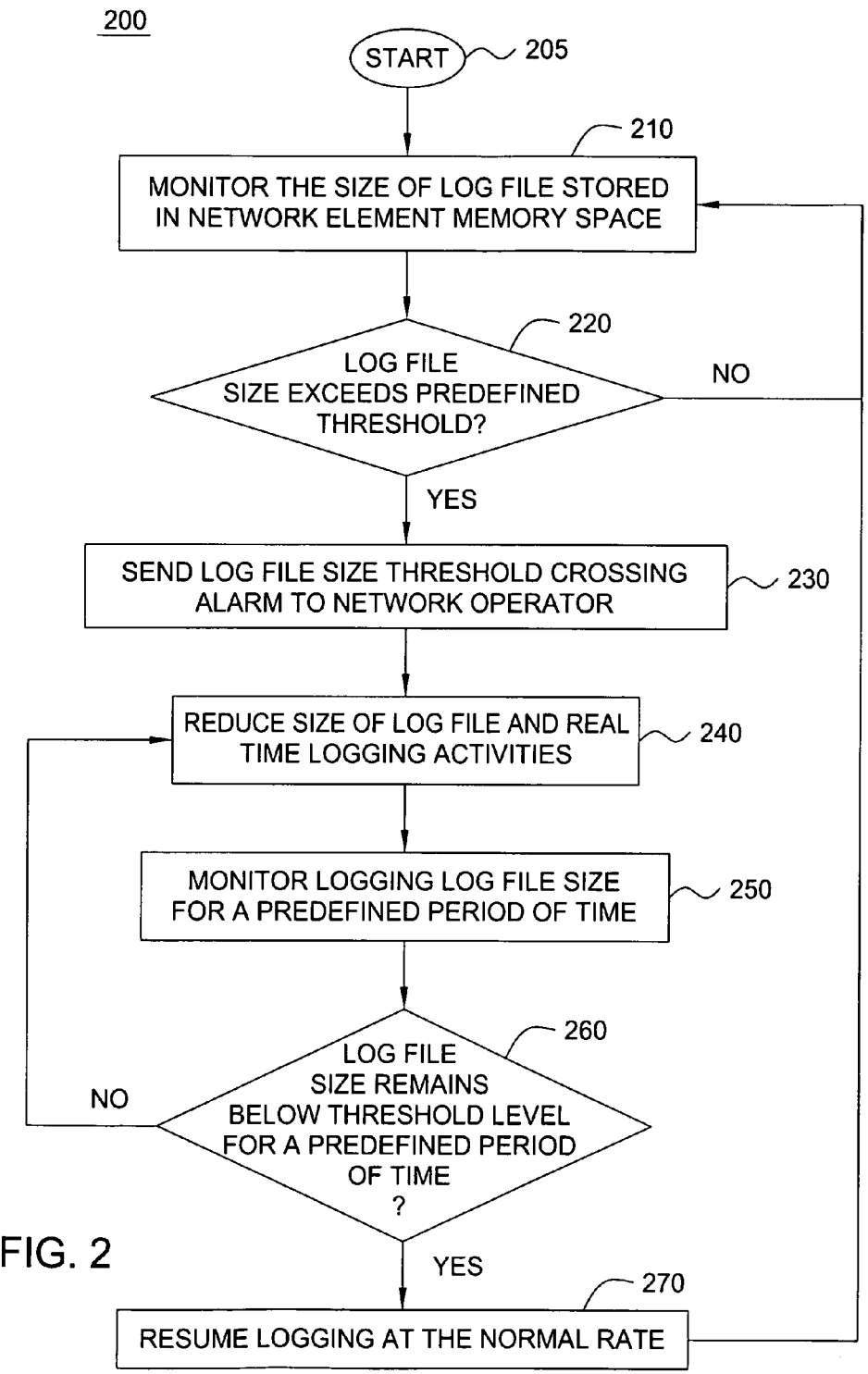
FIG. 2 illustrates a flowchart of a method for proactively controlling logging in a VoIP network of the present invention.

FIG. 2 illustrates a flowchart of a method 200 for proactively controlling logging in a packet network, e.g., a VoIP network of the present invention. Method 200 starts in step 205 and proceeds to step 210.

In step 210, the method monitors the size of log files stored in the memory space of a network element. For example, the system may monitor a percentage of the memory space that is currently dedicated to store log files.

In step 220, the method checks if the size of the log files in memory space exceeds the predefined threshold, e.g., 30% and so on. If the size of the log files in memory space exceeds the predefined threshold, the method proceeds to step 230; otherwise, the method proceeds back to step 210.

In step 230, the method sends a log file size threshold crossing alarm to the network operator or an automated system, e.g., an application server. For example, an alarm message or signal can be generated and forwarded to the network operator or an automated system. In turn, the automated system may automatically send an instruction to the network element to reduce the logging activities without the involvement of the network operator. Alternatively, the network operator may view the pertinent information first, e.g., the cause for the high logging activities, before deciding to issue an instruction to the network element to reduce the logging activities.

In step 240, the method reduces the size of the log files by truncating the log files, e.g., certain information may be omitted in the logging operation. Alternatively, the method may also reduce the rate of real time logging activities.

In step 250, the method monitors the size of the log files for a predefined period of time, e.g., 5 minutes, 10 minutes, and so on and then proceeds to step 260. Namely, the system will monitor to see if the change has the desired effect in reducing memory space usage.

In step 260, the method checks if the size of the log files remain below the predefined threshold level for a predefined period of time. If the size of the log files remain below the predefined threshold level for the predefined period of time, the method proceeds to step 270; otherwise, the method returns to step 240 where the method will make another adjustment.

In step 270, the method resumes the normal level of logging and then proceeds back to step 210.

Figure 3:
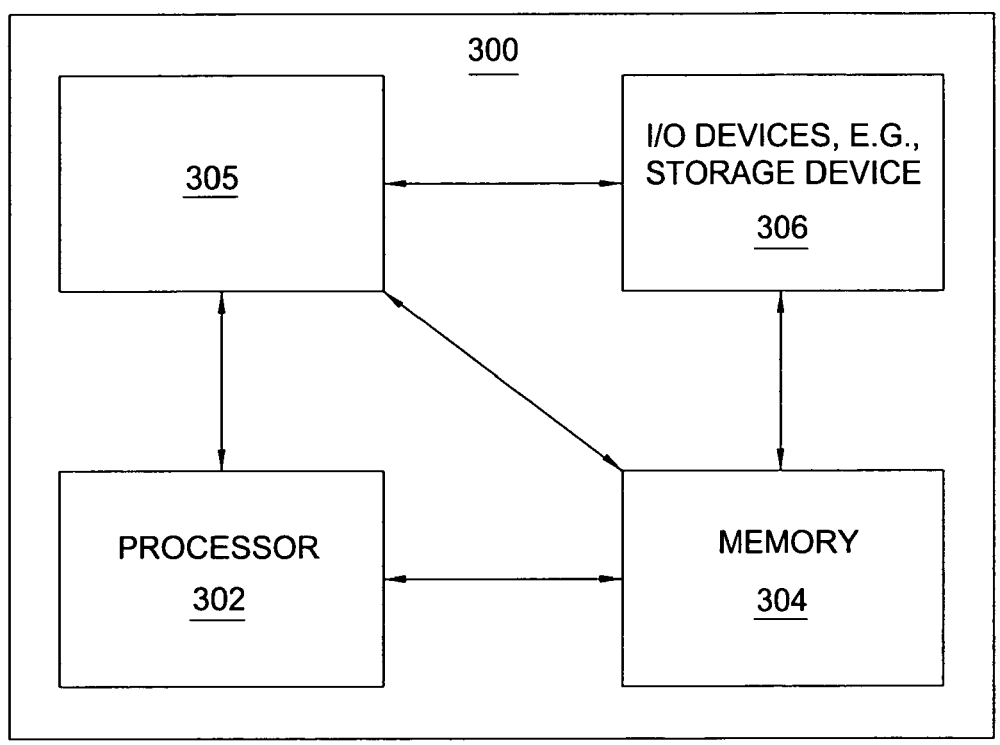
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a logging control module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present logging control module or process 305 can be loaded into memory 304 and executed by processor 302 to implement the functions as discussed above. As such, the present logging control process 305 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling logging in a communication network, comprising:
   monitoring, via a processor, a size of log files stored in a memory space of at least one network element of said communication network;
   reducing logging activities in said at least one network element if said size of log files exceeds a predefined threshold;
   monitoring if said size of log files remains below said predefined threshold for a predefined period of time; and
   resuming a normal level of logging activities if said size of log files remains below said predefined threshold for said predefined period of time.

2. The method of claim 1, wherein said communication network is a Voice over Internet Protocol (VoIP) network or a Service over Internet Protocol (SoIP) network.

3. The method of claim 1, wherein said predefined threshold is a configurable parameter set by a network operator.

4. The method of claim 1, further comprising:
   sending an alarm to a network operator or an automated system indicating that said predefined threshold has been exceeded.

5. The method of claim 4, wherein said automated system automatically sends an instruction to said at least one network element to reduce said logging activities.

6. The method of claim 1, wherein said reducing logging activities comprises at least one of: truncating said log files, or reducing a rate of said logging activities.

7. A non-transitory computer-readable storage medium having stored thereon a plurality of instructions, the plurality of instructions including instructions which, when executed by a processor, cause the processor to perform the steps of a method for controlling logging in a communication network, comprising:
   monitoring a size of log files stored in a memory space of at least one network element of said communication network;
   reducing logging activities in said at least one network element if said size of log files exceeds a predefined threshold;
   monitoring if said size of log files remains below said predefined threshold for a predefined period of time; and
   resuming a normal level of logging activities if said size of log files remains below said predefined threshold for said predefined period of time.

8. The non-transitory computer-readable storage medium of claim 7, wherein said communication network is a Voice over Internet Protocol (VoIP) network or a Service over Internet Protocol (SoIP) network.

9. The non-transitory computer-readable storage medium of claim 7, wherein said predefined threshold is a configurable parameter set by a network operator.

10. The non-transitory computer-readable storage medium of claim 7, further comprising: sending an alarm to a network operator or an automated system indicating that said predefined threshold has been exceeded.

11. The non-transitory computer-readable storage medium of claim 10, wherein said automated system automatically sends an instruction to said at least one network element to reduce said logging activities.

12. The non-transitory computer-readable storage medium of claim 7, wherein said reducing logging activities comprises at least one of: truncating said log files, or reducing a rate of said logging activities.

13. An apparatus for controlling logging in a communication network, comprising:
   means for monitoring a size of log files stored in a memory space of at least one network element of said communication network;
   means for reducing logging activities in said at least one network element if said size of log files exceeds a predefined threshold;
   means for monitoring if said size of log files remains below said predefined threshold for a predefined period of time; and
   means for resuming a normal level of logging activities if said size of log files remains below said predefined threshold for said predefined period of time.

14. The apparatus of claim 13, wherein said communication network is a Voice over Internet Protocol (VoIP) network or a Service over Internet Protocol (SoIP) network.

15. The apparatus of claim 13, wherein said predefined threshold is a configurable parameter set by a network operator.

16. The apparatus of claim 13, further comprising:
   sending an alarm to a network operator or an automated system indicating that said predefined threshold has been exceeded.

17. The apparatus of claim 15, wherein said reducing logging activities comprises at least one of: truncating said log files, or reducing a rate of said logging activities.

* * * * *